W. V. TURNER.
TRIPLE VALVE DEVICE.
APPLICATION FILED JULY 23, 1909.

1,131,180.

Patented Mar. 9, 1915.
6 SHEETS—SHEET 1.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

TRIPLE-VALVE DEVICE.

1,131,180.

Specification of Letters Patent.

Patented Mar. 9, 1915.

Original application filed March 8, 1909, Serial No. 481,942. Divided and this application filed July 24, 1909. Serial No. 509,168.

*To all whom it may concern:*

Be it known that I, WALTER V. TURNER, a citizen of the United States, residing at Edgewood, in the county of Allegheny and State of Pennsylvania, have invented new and useful Improvements in Triple-Valve Devices, of which the following is a specification.

This invention relates to fluid pressure brakes, and more particularly to a triple valve device.

One object of my invention is to provide a triple valve device having means for venting the brake pipe to cause quick serial action in emergency applications by which air is first vented from the brake pipe to the brake cylinder and then to the atmosphere.

Another object is to provide an improved means for preventing the movement of the triple valve to emergency position upon gradual reductions in brake pipe pressure while preserving the capability of obtaining at all times an emergency action of the parts upon a sudden reduction in brake pipe pressure and regardless of previous service reductions in brake pipe pressure.

Another object is to provide improved means for causing an emergency action of the triple valve upon any reduction in brake pipe pressure below a predetermined minimum degree.

Another object of my improvement is to improve, in certain respects, the construction shown and described in my prior pending application, Serial No. 481,942, filed March 8, 1909.

In the accompanying drawings.

Figure 1:
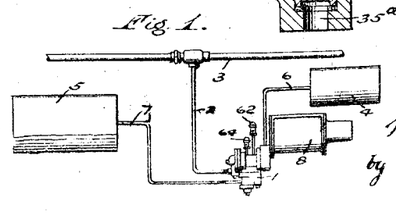
Figure 1 is a diagrammatic view of a car air brake equipment with the improved triple valve device applied thereto.

According to Fig. 1 of the drawings, a triple valve device 1 embodying my improvement is connected by branch pipe 2 to the brake pipe 3, and to auxiliary reservoir 4 and supplemental reservoir 5 by pipes 6 and 7 respectively, the equipment also including the usual brake cylinder 8.

Figures 2, 6, 7, 8:
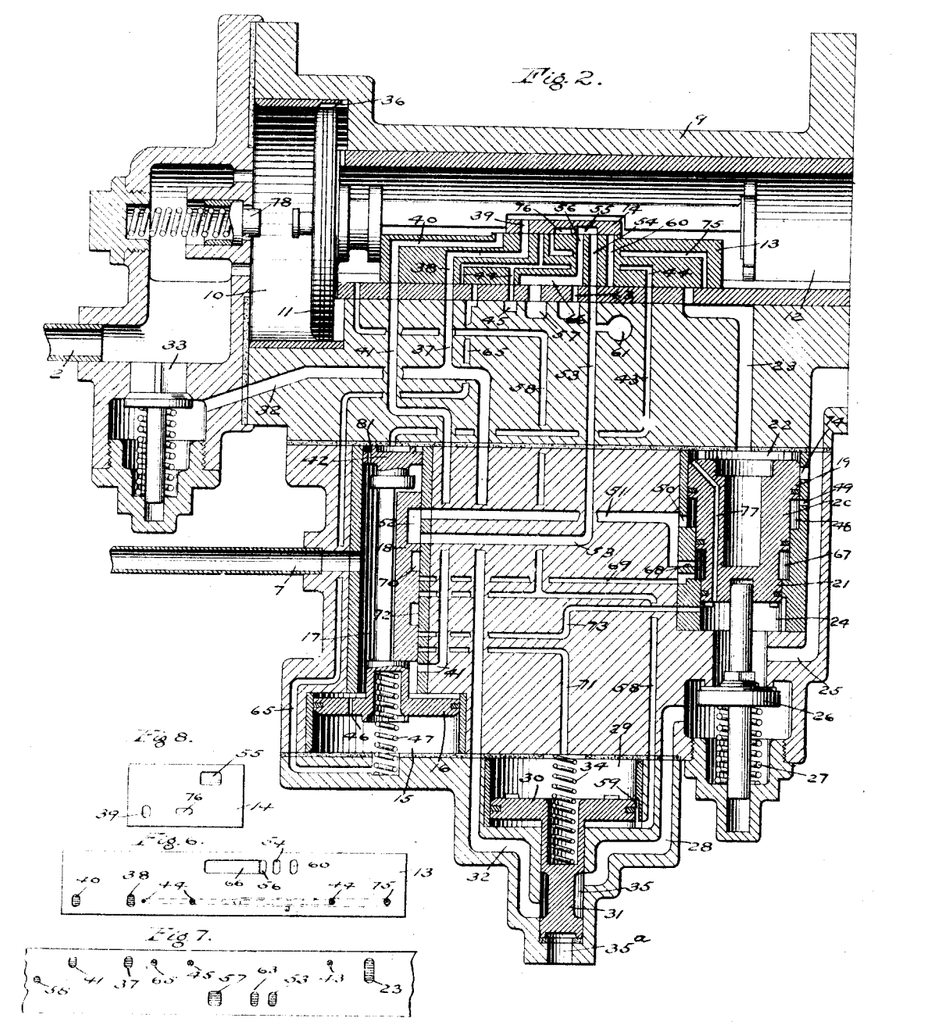
Fig. 2 a substantially central sectional view of a triple valve device embodying my improvements and showing the parts in full release position.
Fig. 6 a face view of the main slide valve of the above triple valve device showing the relative location of the ports and cavities therein.
Fig. 7 a plan view of the valve seat for said slide valve.
Fig. 8 a face view of the graduating valve which is mounted on and has a movement relative to said main slide valve.

The triple valve device may comprise, as shown in Fig. 2, a casing 9 having piston chamber 10 containing triple valve piston 11, valve chamber 12 open to the auxiliary reservoir 4 and containing main slide valve 13 and graduating slide valve 14, mounted on said main valve and having a movement relative thereto. The triple valve casing is further provided with a piston chamber 15 containing piston 16 and a valve chamber 17 into which the supplemental reservoir pipe 7 opens and containing a slide valve 18 adapted to be operated by piston 16, the piston and valve being hereinafter designated as the by-pass valve device, as same controls communication from the supplemental reservoir to the brake cylinder in emergency applications of the brakes. A differential piston valve device having piston heads 19, 20, and 21 is contained in a piston chamber of the casing, the portion 22 of said chamber open to one face of piston head 19 being connected to a passage 23 leading to the seat of the main slide valve 13, and the portion 24 at one face of the piston head 21 being in open communication with a passage 25, leading to the brake cylinder. This differential piston will be known as the change-over valve device and controls the admission of air first from the auxiliary reservoir and then from the supplemental reservoir to the brake cylinder. The differential piston also controls the operation of a vent valve 26, subject on one side to the pressure of a spring 27 tending to hold the valve closed and controlling communication to brake cylinder passage 25 from a passage 28. Within a piston chamber 29 is mounted a piston 30 for controlling a valve 31. A brake pipe vent passage 32 containing the usual check valve 33 leads to the valve 31 and in the normal position of said valve, at which it is maintained by a spring 34, an annular port 35 establishes communication from the passage 32 to passage 28. In this position the valve 31 also closes an atmospheric vent port 35ª which is adapted to open to vent passage 32 when the piston 30 moves to its opposite position.

In operation, air supplied to the brake pipe flows through branch pipe 2 to piston chamber 10 and thence around piston 11 through the usual feed groove 36 charging the auxiliary reservoir to the standard pressure carried in the brake pipe. A quick recharge passage 37 may lead to the main slide valve seat from the brake pipe vent passage 32 and communication from passage 37 being open through ports 38 and 39 in the main slide valve 13 and graduating valve 14 respectively, to valve chamber 12, an additional flow of air to the auxiliary reservoir is secured which facilitates the quick charging of the auxiliary reservoir. A port 40 in the main slide valve registers with passage 41 leading to the seat of slide valve 18 and in release position of the parts air is supplied from the valve chamber 12 through passage 41 to valve chamber 17 and thence through pipe 7 to charge the supplemental reservoir 5 to the normal standard pressure. The by-pass valve device is provided with a differential piston head 42, the portion of the valve chamber 17 at the outer face of which is open to a passage 43 leading to the seat of the main slide valve and is connected in release position by a port 44 in the main slide valve with an exhaust port 45. Fluid in valve chamber 17 equalizes through an equalizing port 46 in piston 16 into the portion of piston chamber 15 at the outer face of piston head 16, so that, as outer face of piston head 42 is subject to atmospheric pressure, the by-pass valve device is maintained in the normal position shown in Fig. 2. A spring 47 may also be provided for the purpose of assisting in maintaining the by-pass valve device in said normal position. In the normal position of the change-over valve device, an annular chamber 48, intermediate the differential piston heads 19 and 20, connects a port 49 opening to brake cylinder passage 25 with port 50 opening into a passage 51. Slide valve 18 is provided with a cavity 52 which is adapted to connect the passage 51 with a passage 53 leading to the seat of the main slide valve 13 and in release position said passage 53 registers with port 54 in the main slide valve which is connected by cavity 55 in the graduating valve 14 and port 56 in the main slide valve with exhaust port 57. The brake cylinder is thus connected to the exhaust in release position. A passage 58 leading from the seat of the main slide valve 13 opens into the portion of piston chamber 29 at one side of piston 30 and as the piston 30 opens an equalizing groove 59 in its normal position, fluid equalizes into the portion of piston chamber 29 at the opposite side of piston 30 so that the fluid pressures equalize on piston 30 permitting spring 34 to maintain the parts in the position closing atmospheric exhaust port 35ª.

In order to cause a service application of the brakes, the usual gradual reduction in brake pipe pressure is made and the triple valve piston 11 is shifted outwardly. According to the present invention, the graduating valve 14 is provided with a lost motion relative to the piston 11, such that the preliminary or initial movement of said piston first closes the feed groove 36 before moving the graduating valve. The piston 11 is thus rendered very sensitive to even slight reductions in brake pipe pressure and consequently, the feed groove being promptly closed in making an application of the brakes, back flow of fluid from the auxiliary reservoir to the train pipe is prevented. The graduating valve 14 then moves, closing the supplemental reservoir charging port 40, quick recharge port 38, and the brake cylinder exhaust, and the service port 60 is uncovered. The main slide valve 13 is then shifted, bringing the service port 60 into register with passage 53, the usual graduating stop 78 then tending to prevent further outward movement of piston 11, and thereupon fluid from the auxiliary reservoir flows through passage 53, cavity 52 in slide valve 18, passage 51, port 50, annular space 48 in the change-over valve, and port 49 to brake cylinder passage 25. The so-called quick service feature may be secured by providing a port 75 in the main slide valve and a cavity 76 in the graduating valve 14, so that in moving to service application position, port 75 registers with passage 23 and is connected through cavity 76 with branch port of port 44 and as port 44 is adapted to register with brake pipe passage 37 at the same time that port 75 registers with passage 23, air is vented from the brake pipe to chamber 22 of the change-over valve device and thence moving said valve device slightly from its seat through a port 77 in in said valve device to the brake cylinder. When the auxiliary reservoir pressure has reduced by flow into the brake cylinder to a point slightly less than the brake pipe pressure, the triple piston moves inwardly, causing the graduating valve 14 to lap the service port 60. Further reductions in brake pipe pressure may be made to correspond ingly increase the brake cylinder pressure in the usual manner as will be readily understood.

A passage 61 opening into the passage 53 leads to a safety or reducing valve 62 which is adjusted to the maximum degree of pressure desired in the brake cylinder in service applications, so that fluid admitted to the brake cylinder in excess of said maximum pressure is relieved by the safety valve. If it should happen that a further reduction in brake pipe pressure be made after the auxiliary reservoir has fully equalized into the brake cylinder, the triple valve piston will be shifted outwardly beyond service position so that the service port 60 is brought into register with a port 65 leading to a second safety or reducing valve 64. Fluid from the auxiliary reservoir is then vented by way of the safety valve 64, and upon reduction of the auxiliary reservoir pressure by this means to a point equal to or slightly less than the brake pipe pressure, the triple valve piston is moved inwardly causing the graduating valve 14 to lap the service port 60 and prevent further venting of fluid from the auxiliary reservoir. The triple valve is thus prevented from going to emergency position, with the attendant undesired production of quick serial action and an emergency application of the brakes. However, the safety valve 64 is adjusted to a certain predetermined minimum degree of pressure, for instance 30 pounds, so that if the brake pipe should be reduced to or below 30 pounds, the auxiliary reservoir pressure will not be further reduced and the auxiliary reservoir pressure then preponderating, the triple valve parts are shifted to emergency position to cause an emergency application of the brakes.

Figure 3:
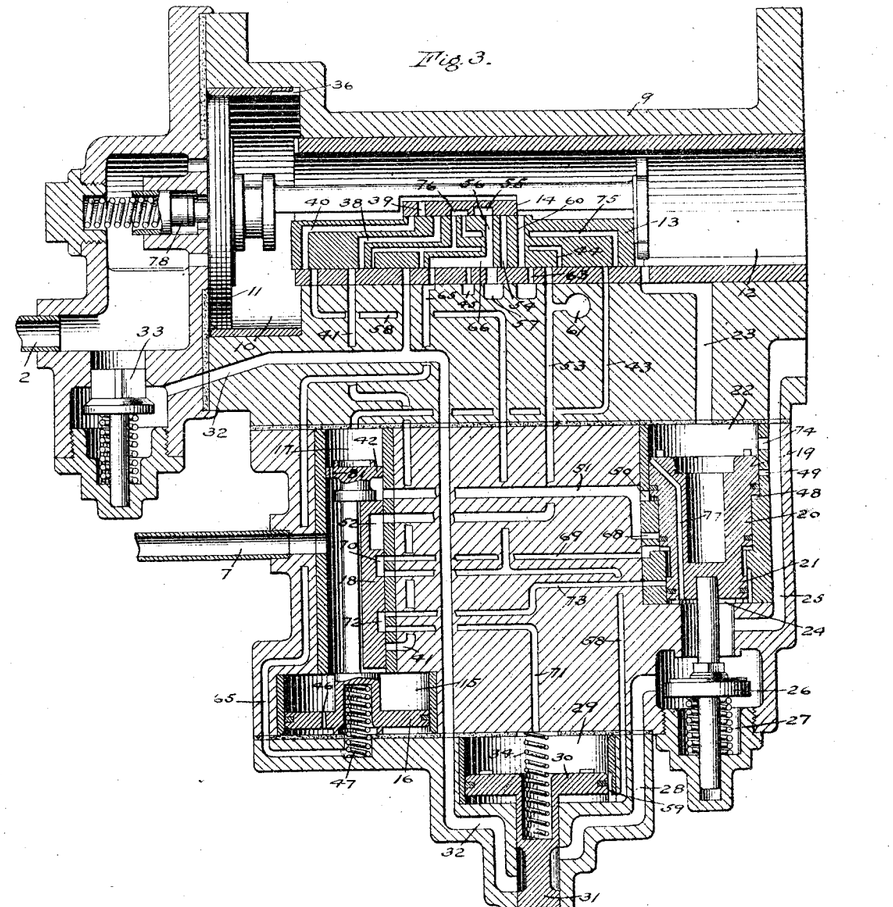
Fig. 3 a similar view showing the initial positions assumed by the parts in an emergency application with the brake pipe venting only to the brake cylinder.
Figure 4:
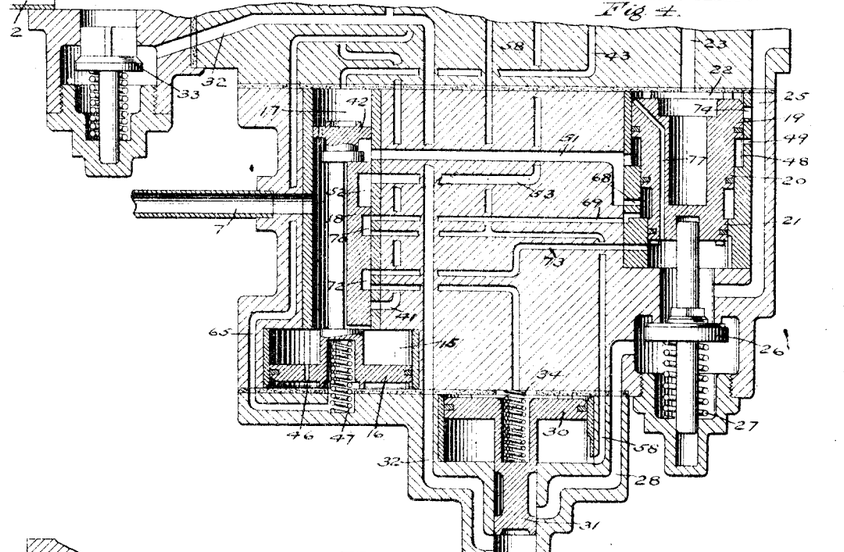
Fig. 4 a similar view of the parts in emergency application position with the brake pipe venting only to the atmosphere.

In emergency position, a passage 65 leading from the piston chamber at the outer face of the by-pass piston 16 to the seat of the main slide valve 13, registers with an extension 66 of port 56 in the main slide valve, and as this extension also registers with exhaust port 57, fluid is vented from the outer face of piston 16, so that the supplemental reservoir pressure on the opposite face thereof acts to shift the piston and the by-pass valve 18 to the extreme outer position, as shown in Fig. 3, in which the passage 51 is uncovered. The passage 23 to the piston chamber 22 being open to the auxiliary reservoir, the change-over valve device is subject in one direction to auxiliary reservoir pressure and in the opposite direction to brake cylinder pressure and as these two pressures are now equalized, the change-over valve device remains in the normal position shown in Fig. 2. It will thus be seen that fluid from the supplemental reservoir may flow from the valve chamber 17 through passage 51, port 50, annular space 48, and port 49 to brake cylinder passage 25, so that by the equalization of the supplemental reservoir pressure into the brake cylinder, a high degree of pressure is obtained in the brake cylinder.

In the normal position of the change-over valve device, an annular space 67 intermediate the piston heads 20 and 21 connects a port 68 opening to passage 51 with a passage 69 leading to the seat of by-pass valve 18, and a cavity 70 in said valve 18 connects passage 69 with passage 58 leading to the outer face of piston 30. Thus communication is open from the supplemental reservoir to one side of piston 30 and as the chamber at the opposite side of said piston is open through a passage 71, cavity 72 in slide valve 18, and passage 73 to the chamber adjacent the piston head 21 containing fluid at brake cylinder pressure, the higher pressure of the supplemental reservoir shifts the piston 30 inwardly, causing valve 31 to open the atmospheric port 35" to brake pipe vent passage 32, thereby venting fluid from the brake pipe to the atmosphere and producing quick serial action of the triple valves in the train in the usual well known manner.

An emergency application of the brakes may be effected by making a sudden reduction in brake pipe pressure either by manipulation of the brake valve or when the train breaks in two and thereupon the triple valve piston is shifted to its extreme outer position, in which air from the auxiliary reservoir is admitted to chamber 22 of piston head 19 and as there is no pressure in the brake cylinder acting on the opposite head 21, the change-over valve is shifted outwardly, opening a port 74 connecting chamber 22 with brake cylinder passage 25. Fluid from the auxiliary reservoir then flows through said port and into the brake cylinder. The outward movement of the change-over valve also lifts the brake pipe vent valve 26 from its seat, thus permitting the brake pipe to vent to the brake cylinder from passage 22, through the annular port in valve 31, and passage 28 to brake cylinder passage 25. Passage 65 being connected through port 66 of the main slide valve 13 with exhaust port 57, air is vented from the chamber at the outer face of piston 16 and the supplemental reservoir pressure on the opposite side shifts the piston 16 and valve 18 so as to uncover the passage 51. In order to insure the maintenance of piston 16 on its seat, a small equalizing port 81 may be provided in piston head 42, so as to permit fluid to equalize on opposite sides of same as otherwise there might be a sufficient difference in pressure in chamber 17 so that the fluid equalizing through port 46 into the space at the outer face of piston 16 would be sufficient with the aid of spring 47 to move the piston away from its seat. It will be noted that with the change-over valve at its outer position, as shown in Fig. 3, communication through passage 51 is closed, as well as through passage 69, so that fluid from the supplemental reservoir is prevented from flowing to the brake cylinder and to the piston 30, so long as the change-over valve remains in its outer position. Upon equalization of the auxiliary reservoir pressure into the brake cylinder through the port 74, the higher supplemental reservoir pressure acting on the exposed area of piston head 19 in the annular space 48, together with the assistance of spring 27, moves the change-over valve toward the inner normal position. The change-over valve moving inwardly brings the differential area between piston heads 20 and 21 into register with port 68, so that fluid at supplemental reservoir pressure is admitted thereto, thus suddenly increasing the pressure on this differential area, and causing the quick positive movement of the change-over valve to its inner position and thereby closing the brake pipe vent valve 26 and the auxiliary reservoir passage 23. In this position of the change-over valve, the annular port 67 connects port 68 with passage 69 and consequently air from the supplemental reservoir is admitted to passage 58 whence it flows to the outer face of piston 30 and the opposite face of the piston being connected to the brake cylinder through passage 71, cavity 72 in by-pass valve passage 73, said piston is thereupon shifted so as to open the atmospheric vent port 35 to the brake pipe vent passage 32, and thereby vent a further amount of air from the brake pipe. Communication is also established from the passage 51 through port 50, annular space 48 and port 49 to the brake cylinder passage 25 and the brake cylinder, thus charging the brake cylinder to a higher degree of pressure by the flow of air from the supplemental reservoir. As the maintenance of the emergency piston 30 in its inner position depends upon the preponderance of the supplemental reservoir pressure acting on the outer face over the brake cylinder pressure acting on the inner face, as soon as the supplemental reservoir pressure has substantially equalized into the brake cylinder, the opposing fluid pressures on piston 30 correspondingly become balanced and the spring 34 shifts the piston 30 and valve 31 to close the atmospheric exhaust port 35.

Figure 5:
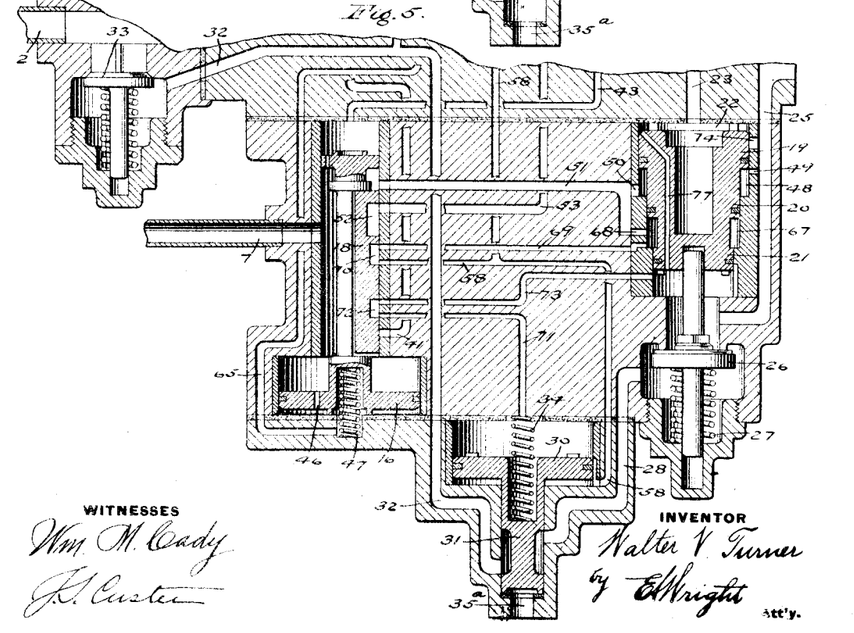
Fig. 5 a similar view showing the positions of the parts as finally assumed in an emergency application.

To release the brakes after an emergency application, the brake pipe pressure is increased and the triple valve piston is thereby returned to full release position, as shown in Fig. 2. It will be remembered that the emergency parts of the triple valve are now in the positions shown in Fig. 5 with the change-over valve and emergency piston 30 in their normal release position.

By the movement of main slide valve 13 to release position, passage 43 is connected by port 44 with exhaust port 45, so that the outer face of piston head 42 is open to atmospheric pressure. The fluid pressure acting on the outer face of piston 16 then exceeding the pressure acting in the opposite direction, the by-pass valve device is shifted to its normal inner position, the spring 47 assisting the movement. This movement of the by-pass valve causes cavity 52 to connect passages 51 and 53, so that the brake cylinder is connected with the exhaust through port 54, cavity 55 and port 56 and fluid under pressure is released from the brake cylinder. As the auxiliary reservoir pressure is lower than the equalized pressure in the brake cylinder and supplemental reservoir, when the passage 41 is uncovered by the movement of valve 18 to its inner position, fluid will equalize from the supplemental reservoir back into the auxiliary reservoir in addition to the usual recharging through feed groove 36 and the quick recharge passage 37.

Figure 9:
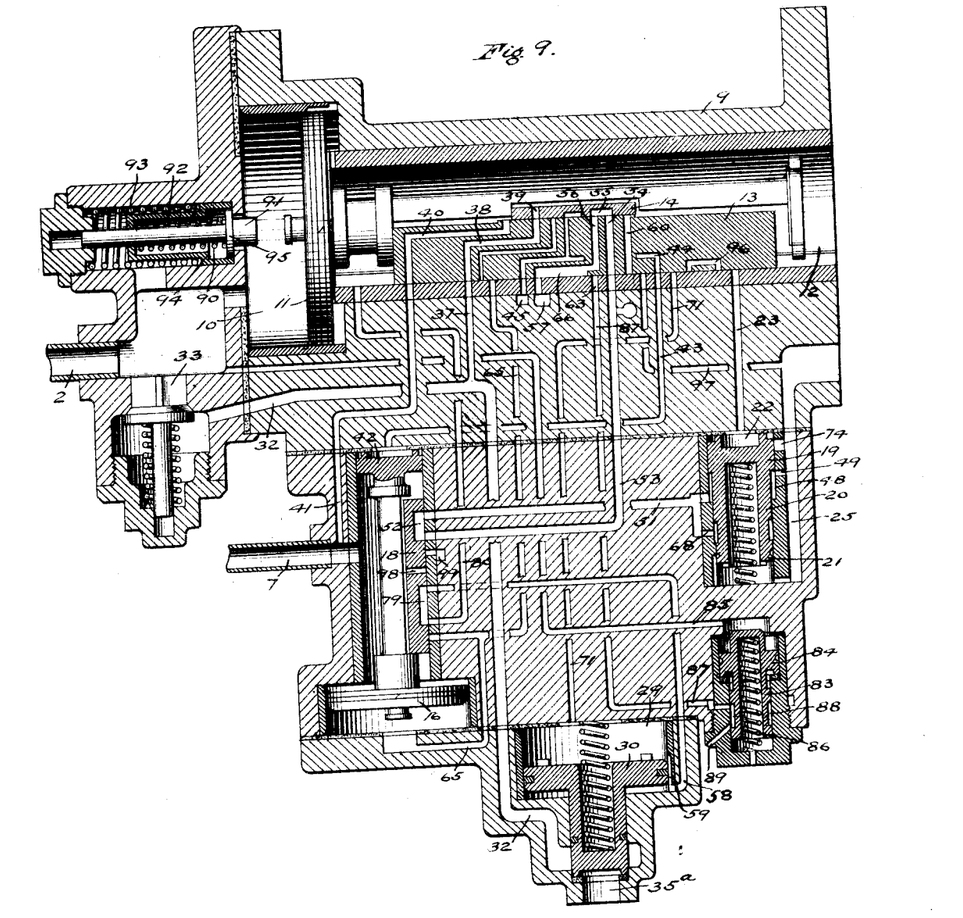
Fig. 9 a central sectional view of a modified construction of a triple valve device embodying my improvement.

In Fig. 9 a somewhat modified construction of a triple valve device embodying my improvement is shown. The brake cylinder vent valve is not employed in this construction, the brake pipe being vented only to the atmosphere. Passage 71 to chamber 29 of piston 30 leads directly to the seat of the main slide valve 13 and passage 28 is controlled by the by-pass valve 18, a cavity 79 of which is adapted to connect said passage in the normal position with a passage 80 opening into the main valve chamber 12. Instead of the reducing valve 64, a valve device 83 is employed in this construction, said valve device comprising a piston 84 continually subject on one side to brake pipe pressure admitted thereto through a passage 85 and on the opposite side to the pressure of a spring 86. The spring is of such tension that at brake pipe pressures above a certain minimum degree, say 30 pounds, the valve device 83 will be maintained in normal position, as shown in Fig. 9, in which a passage 87 leading to the seat of the main slide valve 13 is connected by an annular port 88 in the valve device 83 with an atmospheric exhaust port 89. It will thus be seen that upon making a reduction in brake pipe pressure after equalization of the auxiliary reservoir into the brake cylinder, the triple piston 11 moving out beyond service position causes the service port 60 to register with passage 87, so that fluid from the auxiliary reservoir is vented to the atmosphere through the annular port 88 of the valve device 83. When the brake pipe pressure is reduced below 30 pounds, however, the spring 86 shifts the valve device 83 to its inner position, in which the exhaust port 89 is cut off from communication with the passage 87, and further venting of air from the auxiliary reservoir is prevented. The triple valve then goes to emergency position as in the first described construction. Separate springs may be employed for resisting the movement of the triple valve parts in service applications and in the movement after reducing the brake pipe pressure below the equalization point and for this purpose a spring 90 may be provided which is adapted to act on a graduating stem 91 for assisting to return the triple valve parts from service application position to lap in the usual manner. The spring 90 is carried in a socket 92, maintained normally in one position by a second spring 93 and having an annular shoulder 94 upon which a collar 95 of the stem 91 is adapted to engage as the triple valve parts move out beyond service application position. It will now be seen that if the triple valve parts are shifted out beyond service position, further compression of the spring 90 is prevented while the second spring 93 is compressed, thus the movement of the parts is governed by the action of separate springs according to whether the usual service reductions in brake pipe pressure are being made or reductions below the equalizing point.

In an emergency application, the by-pass valve piston 16 is moved out by the venting of air from the piston chamber through passage 65 to the atmosphere, and emergency piston 30 is operated by connecting the passage 71 leading to said piston through a cavity 96 with a passage 97 opening to the brake cylinder, so that the emergency valve device operates at once upon movement of the main slide valve to emergency position to vent air from the brake pipe to the atmosphere, fluid at supplemental reservoir pressure being admitted to the opposite side of piston 30 by the movement of the by-pass valve 16, which connects a port therein with passage 58, leading to said opposite side. An exhaust port 98 is provided in the seat for the by-pass valve 16 and when the by-pass valve slides to emergency position, said port registers with cavity 52, which also connects with passage 82, so that any leakage of air into said passage or the cavities open thereto in release position of the main slide valve will be vented to the atmosphere, thus preventing the building up of pressure under the main valve such as to tend to lift the valve from its seat.

In releasing after an emergency application of the brakes, the passage 65 being connected by cavity 79 to passage 80, fluid at auxiliary reservoir pressure is admitted to piston 16, and as the opposite side of the piston is subject to supplemental reservoir pressure as equalized into the brake cylinder in an emergency application, the by-pass piston does not at once return to normal release position, and consequently the exhaust of air from the brake cylinder can not take place immediately. This higher pressure, however, soon equalizes into the auxiliary reservoir through the passage 41 and port 40 with the triple slide valve in release position and as soon as this occurs, the pressures are likewise equalized on opposite sides of the piston 16, so that the differential head 42 being open on one side to the atmosphere through passage 43 and port 44, the by-pass valve device is returned to release position and the brake cylinder is connected to the exhaust through passage 51, cavity 52, passage 53, port 54, cavity 55, and port 56. The purpose of this feature is to insure that the pressure in the auxiliary reservoir acting on top of the main slide valve and the graduating valve will be sufficient to prevent possible lifting of the valves by the admission of fluid from the brake cylinder to the cavities in said valves which serve to connect the brake cylinder to the exhaust. This feature is particularly of service in cases where an emergency application is produced after the auxiliary reservoir pressure has been reduced below the equalization point by the venting of air from the auxiliary reservoir to the atmosphere, as under such conditions the pressure in the auxiliary reservoir will be only 30 pounds, while the pressure in the brake cylinder and communicating passages may be nearly 70 pounds after the supplemental reservoir has equalized thereinto.

It will of course be understood that various modifications shown in Fig. 9 may be employed with the construction shown in Figs. 2 to 5, for example, the double graduating spring mechanism may be used instead of the single graduating spring device, and the relief valve device 83 in place of the safety valve 64 by providing the necessary corresponding ports and passages.

Figure 10:
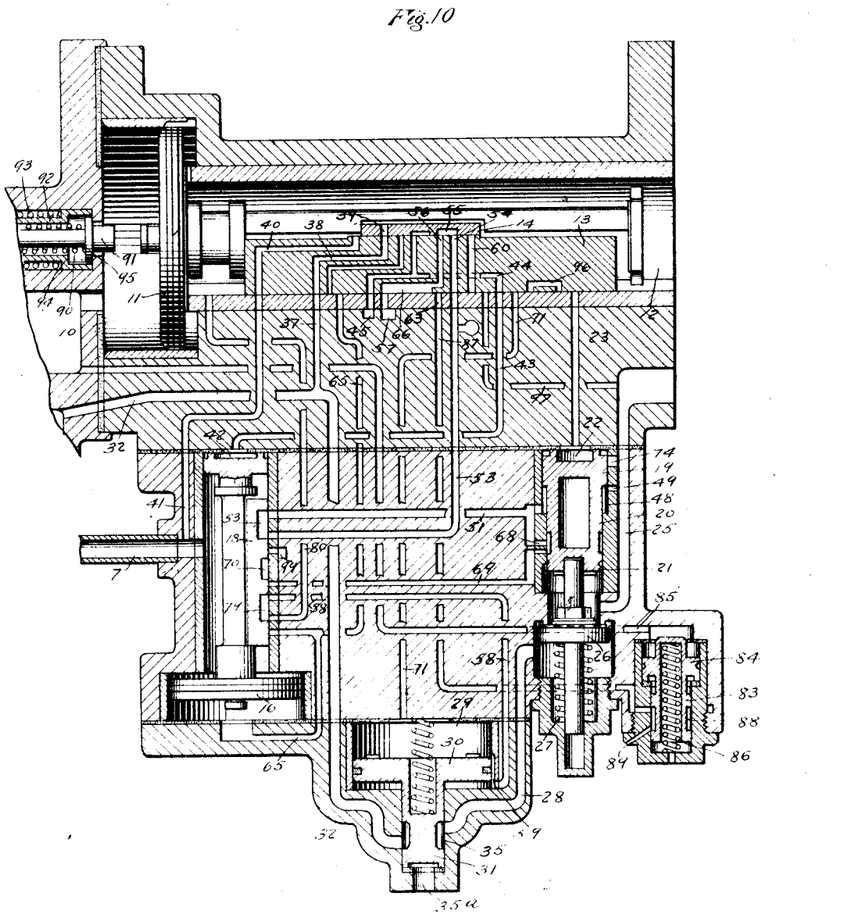
Fig. 10 a central sectional view of a triple valve device embodying features of the invention shown in Figs. 1 to 8 and Fig. 9.

The construction shown in Fig. 10 of the drawings is substantially the same as that shown in Fig. 9 except that the feature shown in the other figures of the drawings of venting the main pipe both to the atmosphere and to the brake cylinder is applied. In view of the above and since the same reference numerals are applied to Fig. 10 as are used in the other figures to designate corresponding parts, it will not be necessary to further explain the operation, as this will be clear from the previous description of the operation of the device as shown in Figs. 1 to 9.

Having now described my invention, what I claim as new and desire to secure by Letters Patent, is:—

1. In a fluid pressure brake, the combination with a brake pipe, triple valve, auxiliary reservoir, and brake cylinder, of a supplemental source of fluid pressure, a valve device normally subject on opposite sides to fluid pressure for controlling communication from said source to the brake cylinder, and means governed by the triple valve for venting fluid from one side of said valve device to the atmosphere upon a sudden reduction in brake pipe pressure to operate said valve device.

2. In a fluid pressure brake, the combination with a brake pipe, auxiliary reservoir, and brake cylinder, of a supplemental reservoir, a valve device comprising valve means for controlling communication from said supplemental reservoir to the brake cylinder and a piston having differential piston heads for operating said valve means and normally subject to opposing fluid pressures and atmospheric pressure on one side, and means operating upon a sudden reduction in brake pipe pressure for venting air from one side of said piston to the atmosphere to operate the same.

3. In a fluid pressure brake, the combination with a brake pipe, brake cylinder, reservoir, and apparatus adapted upon a reduction in brake pipe pressure to supply air from said reservoir to the brake cylinder, of an additional source of fluid pressure, valve means for controlling the supply of fluid from said additional source to the brake cylinder, and a movable abutment for operating said valve means having differential piston heads, one head being normally subject to opposing fluid pressures and the other head to atmospheric pressure on one side, and means for venting fluid from one side of the first head to the atmosphere upon a sudden reduction in train pipe pressure to operate said valve means.

4. In a fluid pressure brake, the combination with a brake pipe and auxiliary reservoir, of a triple valve device comprising a piston subject to the opposing pressures of the brake pipe and auxiliary reservoir and adapted in normal release position to open an unobstructed feed passage from the brake pipe to the auxiliary reservoir, and a main valve and a graduating valve operated by said piston, said piston having a movement independent of said valves to thereby cut off the feed passage upon the initial movement of the piston.

5. In a fluid pressure brake, the combination with a brake pipe and auxiliary reservoir, of a triple valve device comprising a piston subject to vacations in brake pipe pressure and controlling a feed port from the brake pipe to the auxiliary reservoir, and a main valve and a graduating valve operated by said piston, the piston having an independent movement to permit the feed port to be closed before moving the valves.

6. In a fluid pressure brake, the combination with a brake pipe and brake cylinder, of a valve mechanism movable upon a sudden reduction in brake pipe pressure to a position in which fluid is vented from the brake pipe to the brake cylinder and then to a position in which fluid is vented from the brake pipe to the atmosphere.

7. In a fluid pressure brake, the combination with a brake pipe and brake cylinder, of a valve mechanism operating upon a sudden reduction in brake pipe pressure for first venting air from the brake pipe to the brake cylinder in one position and then movable to another position in which air is vented from the brake pipe to the atmosphere.

8. In a fluid pressure brake, the combination with a brake pipe, auxiliary reservoir, and brake cylinder, of a triple valve device operating upon a sudden reduction in brake pipe pressure for supplying air from the auxiliary reservoir to the brake cylinder, and a piston and valve means actuated by said piston for controlling ports and passages through which fluid is first vented from the brake pipe to the brake cylinder in one position of said valve means and then to the atmosphere in another position.

9. In a fluid pressure brake, the combination with a brake pipe, auxiliary reservoir, and brake cylinder, of a triple valve device operating upon a sudden reduction in brake pipe pressure for supplying air from the auxiliary reservoir to the brake cylinder, a valve device operated by the flow of fluid from the auxiliary reservoir to the brake cylinder for venting air from the brake pipe to the brake cylinder, and means governed by said valve device for controlling a vent port from the brake pipe to the atmosphere.

10. In a fluid pressure brake, the combination with a brake pipe, auxiliary reservoir, and brake cylinder, of a triple valve device operating upon a sudden reduction in brake pipe pressure for supplying air from the auxiliary reservoir to the brake cylinder, a valve device operated by the flow of fluid from the auxiliary reservoir to the brake cylinder for opening communication from the brake pipe to the brake cylinder and adapted to close said communication upon equalization of the auxiliary reservoir pressure into the brake cylinder, and means governed by said valve device and adapted to open the brake pipe to the atmosphere upon closing the communication from the brake pipe to the brake cylinder.

11. A triple valve device comprising valve means for controlling the admission of fluid to the brake cylinder, a piston for operating same, a graduating stem for said piston, a spring for opposing the movement of the graduating stem during one portion of its traverse, a second spring for opposing the movement of the graduating stem during another portion of its traverse, and means for preventing the further compression of the first spring during the compression of the second.

12. In a fluid pressure brake, the combination with a brake pipe, auxiliary reservoir, and brake cylinder, of a triple valve device comprising valve means for controlling the admission of fluid from the auxiliary reservoir to the brake cylinder, a piston for operating same, a graduating stem for said piston, a graduating spring for opposing the movement of said stem in making service applications of the brakes, a second graduating spring for opposing a further movement of the graduating stem, and a movable cap containing the first graduating spring and adapted to be engaged by the graduating stem for preventing the further compression of the first graduating spring during the compression of the second.

13. In a fluid pressure brake, the combination with a brake pipe, auxiliary reservoir, and brake cylinder, of a triple valve device comprising a piston and valve means operated by gradual reductions in brake pipe pressure for supplying fluid from the auxiliary reservoir to the brake cylinder and by further gradual reductions for venting air from the auxiliary reservoir, a graduating spring for opposing movement of the piston in supplying air to the brake cylinder, a second graduating spring for opposing movement of the piston in venting fluid from the auxiliary reservoir, and a movable casing carrying the first graduating spring and adapted to move against the resistance of said second graduating spring.

14. A triple valve device comprising a piston and valve means for supplying fluid from the auxiliary reservoir to the brake cylinder upon gradual reductions in brake pipe pressure and adapted upon further gradual reductions to open a communication for venting air from the auxiliary reservoir, and a valve device subject to the opposing pressures of the brake pipe and a spring for controlling said communication.

15. In a fluid pressure brake, the combination with a brake pipe, auxiliary reservoir, and brake cylinder, of a triple valve device comprising a piston and valve means operated by gradual reductions in brake pipe pressure for supplying air from the auxiliary reservoir to the brake cylinder and upon further gradual reductions from the auxiliary reservoir to the atmosphere, and a valve device operating upon a predetermined reduction in brake pipe pressure for closing the communication for venting air to the atmosphere.

16. In a fluid pressure brake, the combination with a brake pipe, auxiliary reservoir, and brake cylinder, of a triple valve device comprising a piston and valve means operated by gradual reductions in brake pipe pressure for supplying air from the auxiliary reservoir to the brake cylinder in service applications and upon a sudden reduction in brake pipe pressure for effecting an emergency application of the brakes and having a position intermediate service and emergency application positions for venting air from the auxiliary reservoir to atmosphere to prevent movement to emergency position upon gradual reductions in brake pipe pressure, and a valve device governed by brake pipe pressure for controlling the communication for venting air from the auxiliary reservoir to the atmosphere.

17. In a fluid pressure brake, the combination with a brake pipe, auxiliary reservoir, and brake cylinder, of a triple valve device comprising a piston and valve means operated by gradual reductions in brake pipe pressure for supplying air from the auxiliary reservoir to the brake cylinder in service applications and upon a sudden reduction in brake pipe pressure for effecting an emergency application of the brakes and having a position intermediate service and emergency application positions for venting air from the auxiliary reservoir to atmosphere to prevent movement to emergency position upon gradual reductions in brake pipe pressure, and a valve device subject to the opposing pressures of the brake pipe and a spring and adapted to close the communication for venting fluid from the auxiliary reservoir to the atmosphere upon a predetermined reduction in brake pipe pressure.

18. A triple valve device comprising a piston subject to variations in brake pipe pressure, valve means operated thereby for controlling the exhaust of air from the brake cylinder and a valve device for controlling the communication from the brake cylinder to the exhaust and adapted to close said communication upon applying the brakes and to hold same closed in releasing the brakes until the auxiliary reservoir pressure becomes substantially equal to the brake cylinder pressure.

19. A triple valve device comprising a piston subject to variations in brake pipe pressure, valve means operated thereby for controlling the exhaust of air from the brake cylinder and a valve device for controlling the communication from the brake cylinder to the exhaust and adapted to close said communication upon an emergency application of the brakes and to maintain said communication closed in releasing the brakes in case the auxiliary reservoir pressure is substantially less than the brake cylinder pressure until the auxiliary reservoir pressure becomes substantially equal to the brake cylinder pressure.

20. In a fluid pressure brake, the combination with a brake pipe, auxiliary reservoir, brake cylinder, and an additional source of fluid pressure, of means operated upon a sudden reduction in brake pipe pressure for first supplying air from the auxiliary reservoir and then from said additional source of pressure to the brake cylinder including a valve device subject on one side to fluid from the additional source of fluid pressure for controlling communication through which fluid is released from the brake cylinder and adapted to close said communication upon a sudden reduction in brake pipe pressure, and means for subjecting the opposite side of said valve device to auxiliary reservoir pressure in releasing the brakes after an emergency application to maintain said communication closed in case the auxiliary reservoir pressure is substantially less than the brake cylinder pressure until the auxiliary reservoir pressure becomes equal to the brake cylinder pressure.

21. A triple valve device comprising a piston subject to variations in brake pipe pressure valve means operated thereby for controlling the exhaust of air from the brake cylinder and a valve device for controlling the communication from the brake cylinder to the exhaust and adapted to close said communication upon an emergency application of the brakes and to maintain said communication closed in releasing the brakes in case the auxiliary reservoir pressure is substantially less than the brake cylinder pressure until the auxiliary reservoir pressure becomes substantially equal to the brake cylinder pressure, and means for venting fluid from the brake cylinder to the auxiliary reservoir in releasing the brakes.

22. In a fluid pressure brake, the combination with a train pipe and triple valve device operated by variations in train pipe pressure, of a valve mechanism for effecting an emergency application of the brakes and a valve device subject to the opposing pressures of the train pipe and a spring for effecting the operation of said valve mechanism upon a predetermined reduction in train pipe pressure.

In testimony whereof I have hereunto set my hand.

WALTER V. TURNER.

Witnesses:
 WM. M. CADY,
 A. M. CLEMENTS.